United States Patent [19]

Rosen

[11] Patent Number: 5,549,354
[45] Date of Patent: Aug. 27, 1996

[54] REFLECTIVE SEAT SHIELD FOR USE WITH INFANT RETAINING DEVICES

[76] Inventor: Steven B. Rosen, 28747 Mauch St., Santa Clarita, Calif. 91350

[21] Appl. No.: 399,823

[22] Filed: Mar. 7, 1995

[51] Int. Cl.$^6$ ............................................ A47C 7/62
[52] U.S. Cl. .................... 297/184.13; 297/184.11
[58] Field of Search .................... 297/250.1, 256.16, 297/184.1, 184.11, 184.13, 219.12, 224, 228.11, DIG. 6

[56] References Cited

U.S. PATENT DOCUMENTS

| | | | |
|---|---|---|---|
| 4,211,261 | 7/1980 | Mehta et al. | 139/425 R |
| 4,478,453 | 10/1984 | Schutz | 297/219.12 |
| 4,658,452 | 4/1987 | Brockhaus | 5/420 |
| 4,724,558 | 2/1988 | Reiff | 5/455 |
| 4,946,221 | 8/1990 | Livingston | 297/184.13 |
| 5,022,101 | 6/1991 | Gosselin et al. | 4/498 |
| 5,309,586 | 5/1994 | Sies et al. | 297/184.13 X |

FOREIGN PATENT DOCUMENTS

| | | | |
|---|---|---|---|
| 4111010 | 1/1992 | Germany | 297/256.16 |

Primary Examiner—Milton Nelson, Jr.

[57] ABSTRACT

A reflective seat shield (commonly referred to as a reflective cover) for use in protecting unoccupied infant retaining devices, such as automobile auxiliary seats (e.g., infant car seats), infant carriers, baby strollers, and the like, from the sun's light and heat. The reflective cover is uniquely designed in such a way as to adaptively fit over a number of different and varying sized and shaped infant retaining devices when in use, and to be compactly folded-up flat or wadded up into a small compact unit for storage when not in use. The reflective cover includes an elastic band or the like along its periphery to retentively hold it closely fitted around and over the infant retaining device. The reflective cover, which is also easily removed from the retaining device allows an attendant to later place a child in the infant receiving seat section of the retaining device which has previously been consistently maintained at a relatively moderate temperature. This protects the child from discomfort and/or injury such as severe burns, etc., caused by exposure to the otherwise relatively extreme temperatures of the retaining device's materials, namely metal, plastic, vinyl and/or fabric.

18 Claims, 3 Drawing Sheets

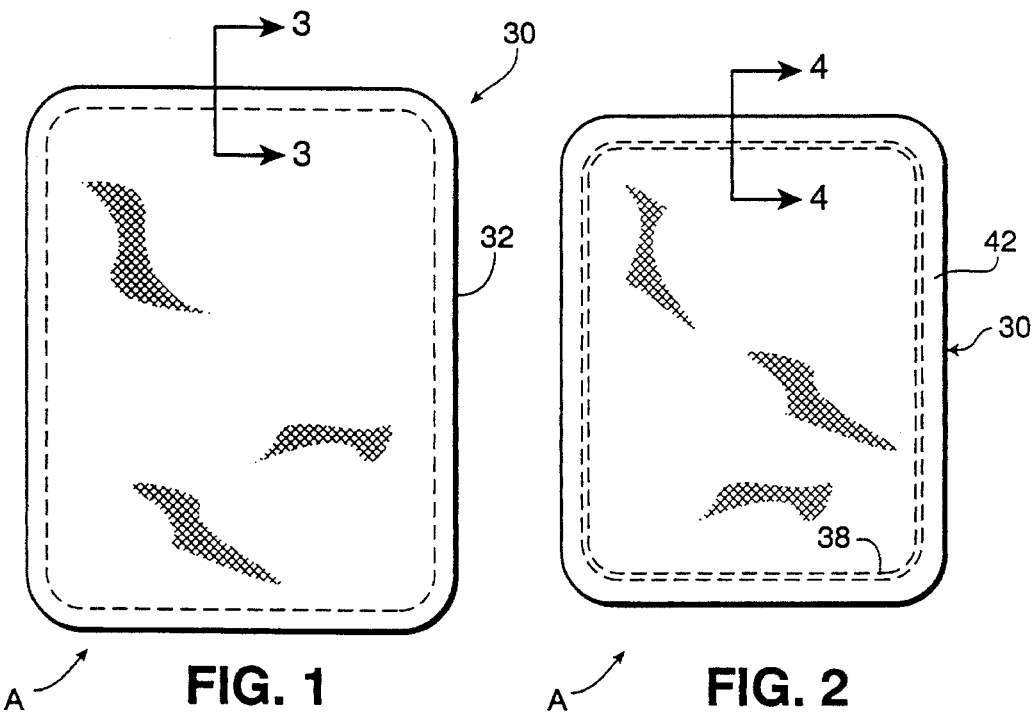
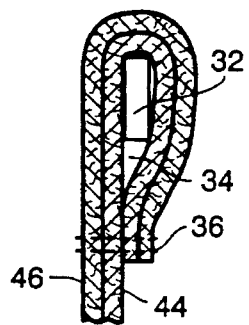
FIG. 3
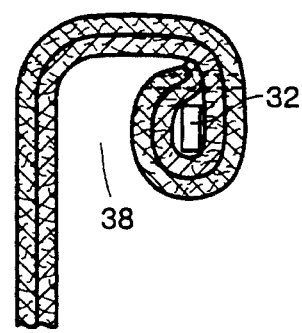
FIG. 4
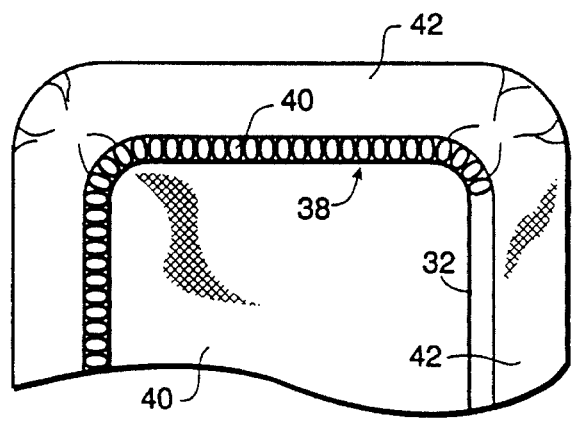
FIG. 5

REFLECTIVE SEAT SHIELD FOR USE WITH INFANT RETAINING DEVICES

BACKGROUND OF THE INVENTION

1. Field of the Invention

This invention relates in general to certain new and useful improvements in protective covers for use with infant retaining devices and more particularly, to a uniquely designed sunlight and heat build-up reflecting protective cover which is capable of being used with a variety of different and varying sized and shaped retaining devices, and which includes a unique construction for retention about any unoccupied infant retaining device with which it is used.

2. Brief Description of Related Art

There is a wide variety of infant retaining devices presently available for use in transporting children in general, and infants in particular. These retaining devices include, for example, seats (e.g. so-called "car seats"), which are secured through seat belts to a seat of a vehicle, strollers, so-called "infant carriers", which are hand-held and carried by an adult, and the like. In each of these cases, the infant retaining devices is designed with an exterior shell having an exterior wall and an upwardly opening infant receiving seat section at least partially surrounded by the exterior wall. The infant is then disposed in the infant receiving seat section and usually retained therein by means of some restraining strap system or the like.

Very frequently, the infant retaining devices are constructed of a molded plastic material and, for that matter, may contain other metal components as, for example, support bars for exterior skeletal structure, and buckles on seat belts or the like. These retaining devices are also constructed in such a manner as to include other material coverings that are sensitive to the effects of heat and cold. When left unattended for a period of time in hot weather conditions, and particularly in a closed vehicle, these portions of the retaining device often become exceedingly hot. If the parent or other attendant to the infant is unaware of the hot temperature of the retaining device or components associated with it, that parent or other attendant can inadvertently place the infant in the retaining device and cause severe burns to the infant. Indeed, there have been cases where infants have received second degree burns by being inadvertently placed in a retaining device where the carrier itself, or components associated with the carrier have heated up significantly during hot weather conditions.

Not only does the burning of an infant in such a situation create physical injury to the child, which very well may necessitate immediate and serious medical attention, but moreover, may produce mental injury in the form of a strong fear and anxiety, resulting in a resistance to being placed in this or any other type of infant retaining device ever again.

Many so-called infant car seat manufacturers have produced rubber or vinyl or fabric linings which are permanently disposed on the car seat, itself. This lining is supposedly designed to reduce the incidence of burning of an infant child placed in the car seat. The same principle has also been used, to some extent, in other forms of retaining devices. However, the vinyl, rubber-like, and even fabric materials continue to be sensitive to heat and furthermore, are often uncomfortable when the infant is seated in the device which again militates against the use the retaining device.

There has been a need for a heat reflective cover which would shield and protect an infant retaining device during conditions in which the retaining device is disposed and situated in a hot environment as, for example, in the inside of an automotive vehicle. Moreover, there is a need for such a protective cover which is universally adaptable for use with a wide variety of infant retaining devices, such as the so-called "car seat" stroller, or the like.

There have been several proposed seat covers for disposition over seats such as automobile seats, stroller seats, and the like, for purposes of reducing incidence of heat absorption and to a lesser degree the cold, by the seat or components associated with the seat. However, in each case, these covers are lacking in several respects. Most importantly, they are not universally adaptable for use with a variety of different types of infant retaining devices. Secondly, they are not very effective in actually reflecting and/or blocking out sunlight and heat build-up. They tend to rely upon the use of an air film between the actual cover and the seated section of the retaining device to create a type of insulation and this, in and of itself, has only very limited effectiveness. Furthermore, these conventionally proposed seat covers oftentimes do not conform to the seat itself, leaving portions of the seat exposed or with the cover not retentively being held on the seat.

Representative of some of these proposed seat covers are those taught in U.S. Pat. No. 5,150,945, dated Sep. 29, 1992 to Aupperlee, et al., U.S. Pat. No. 4,478,453, dated Oct. 23, 1984 to Schultz, and U.S. Pat. No. 4,946,221, dated Aug. 7, 1990 to Livingston. Each of these car seat covers are limited in the manner as previously described and suffer from the aforesaid disadvantages. Thus, there has been the need for such a heat protective reflective cover which is easily positioned and removed and universally adaptable for use with a wide variety of infant retaining devices.

OBJECTS OF THE INVENTION

It is, therefore, one of the primary objects of the present invention to provide a heat protective cover for use with a large number of differing sized and shaped infant retaining devices.

It is another object of the present invention to provide a heat protective cover of the type stated which is formed of a pair of layers, and one of which has a highly reflective solar energy reflecting surface for effectively and efficiently blocking out sunlight and heat build-up from the surface of the cover.

It is a further object of the present invention to provide a heat protective cover of the type stated which has a size and shape so as to fit completely over the seat section of an infant retaining device and to be retained on the exterior shell of the infant retaining device.

It is an additional object of the present invention to provide a heat protective cover of the type stated which can be manufactured at a relatively low cost and which is highly efficient in operation.

It is yet another object of the present invention to provide a heat protective cover of the type stated which includes an elastic band along a portion of its periphery causing a peripheral pocket on the rear side thereof so as to be easily attachable to and removed from an infant retaining device.

With the above and other objects in view, my invention resides in the novel features of form, construction, arrangement and combination of parts presently described and pointed out in the claims.

BRIEF SUMMARY OF THE DISCLOSURE

The present invention relates in general to a removable heat protective cover for use with an unoccupied infant retaining device having an upwardly opening seat section. The infant retaining device adapts to a wide variety of types, as indicted previously, including so-called "car seats" so-called "carriers" strollers, etc. In each case, the retaining device includes an exterior shell having an exterior wall with an upwardly opening seat section.

The retaining device of the present invention is highly effective for use with infants. However, the term "infant" as used in connection with the present invention, is not limited to children of such tender years that they are incapable of walking. Rather, the term "infant" is used in a broad sense to encompass other types of children, as well, who would be placed in these types of retaining devices and including, for example, children through ages 1 through 5 years of age.

The heat protective cover of the present invention is frequently referred to as a "heat reflective cover", since it literally does protect the infant receiving seat section of the infant retaining device from substantial temperature increases in hot weather conditions. However, the heat protective cover of the invention primarily operates by reflecting and blocking out sunlight and heat build-up away from and off of the unoccupied seat, as opposed to creating an air insulation layer therebetween, and is thus referred to as a heat reflective cover.

The heat protective cover of the present invention comprises a soft and pliable sheet material having a first fabric layer for disposition against the infant receiving seat section of the retaining device. The sheet material also comprises a second layer which is incidental to and preferably bonded to the first layer and preferably sandwiched with the first layer. The second layer has a highly reflective solar energy reflecting surface for reflecting and blocking out sunlight and heat build-up and other forms of heat energy which may otherwise impinge upon the retaining device. Due to the fact that the sheet material comprising the protective cover is soft and pliable, it essentially has no internal structural integrity and will conform to a device upon which it is placed.

In a preferred embodiment, the sheet material has size and shape to fit completely over the infant receiving seat section and extend around a portion of an exterior wall of the infant retaining device periphery. This cover thereby repels solar radiation to keep the infant receiving seat section and the covered portion of the exterior wall relatively cool in hot weather conditions and also warmer in colder weather conditions. Moreover, the protective cover is readily removable from the retaining device for use when the infant is later placed in the infant receiving seat section of the retaining device.

The protective cover of the present invention is useable with a large number of infant retaining devices, as aforesaid. In this way, the heat protective cover tends to be transferrable from one form of retaining device to another when in use. Moreover, it is able to be folded up flat or wadded up into a small compact unit for easy storage and/or transport when not in use.

In one of the preferred embodiments of the present invention, an "automatically" tightenable cord, such as an elastic band, extends around a portion of the periphery of the sheet. In a more preferred embodiment, the elastic band extends fully around the entire periphery of the sheet and thereby causes the sheet to fully engage and extend around a portion of the exterior wall of the carrier. The tightenable cord may adopt the form of a drawstring having two free ends extending out of openings along the periphery and which are capable of being manually pulled so as to effectively tighten the drawstring. However, the elastic band is preferred due to its ease of use and convenience of manufacture.

The elastic band or other tightenable cord causes a portion of the sheet to be folded over upon itself on the rear surface thereof. In this way, a pocket is formed along a portion of the periphery of the sheet to receive a peripheral portion of the exterior wall of the carrier. This pocket extends preferably along the entire periphery of the sheet on its rear side. Moreover, it is sized and shaped so as to effectively receive a portion of the retaining device. As an example, in the case of a car seat, the pocket will receive the upwardly extending shell portion which forms the back of the car seat, the downwardly extending shell portion which forms the front base of the car seat, and oftentimes the downwardly extending shell portion which forms the armrest of the seat.

This invention possesses many other advantages and has other purposes which will be made more fully apparent from a consideration of the forms in which it may be embodied. One of the forms of the heat protective cover of the invention is more fully described in the following detailed description, and more fully illustrated in the accompanying drawings. However, it is to be understood that these drawings and the following detailed description are set forth for purposes of illustrating and describing the general principles of the invention and are therefore not to be taken in a limiting sense.

BRIEF DESCRIPTION OF THE DRAWINGS

Figure 6:
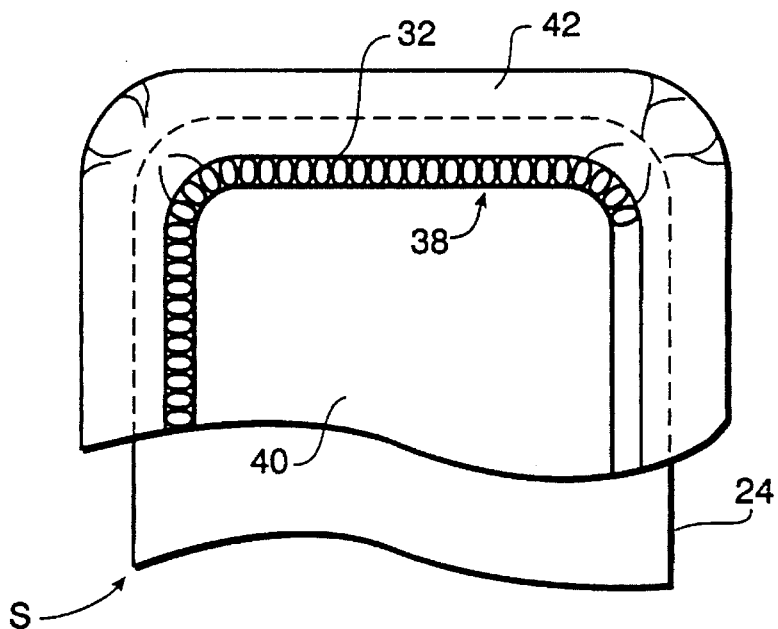
Figure 11:
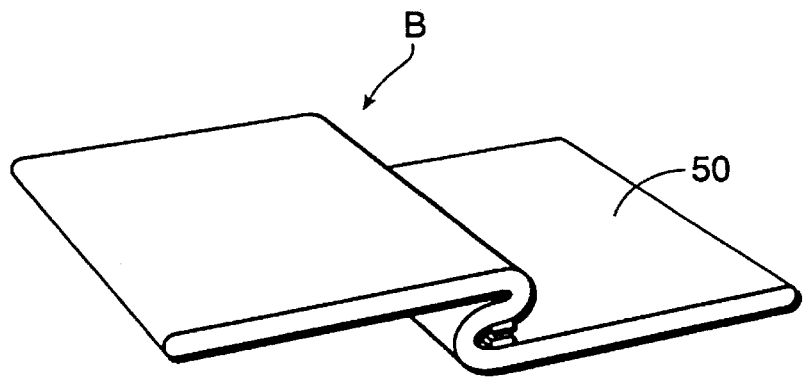
Figure 12:
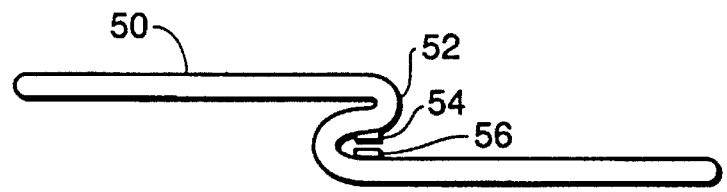
Figure 7:
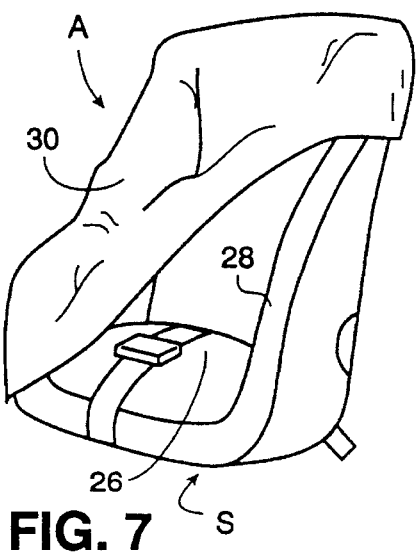
Figure 8:
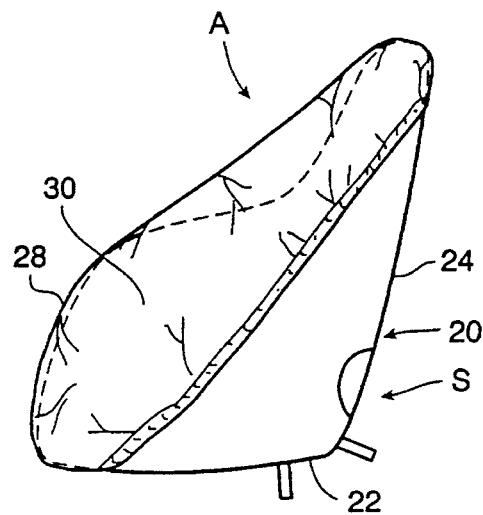
Figure 9:
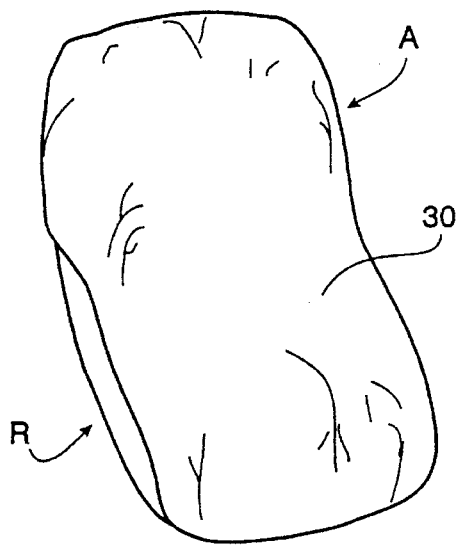
Figure 10:
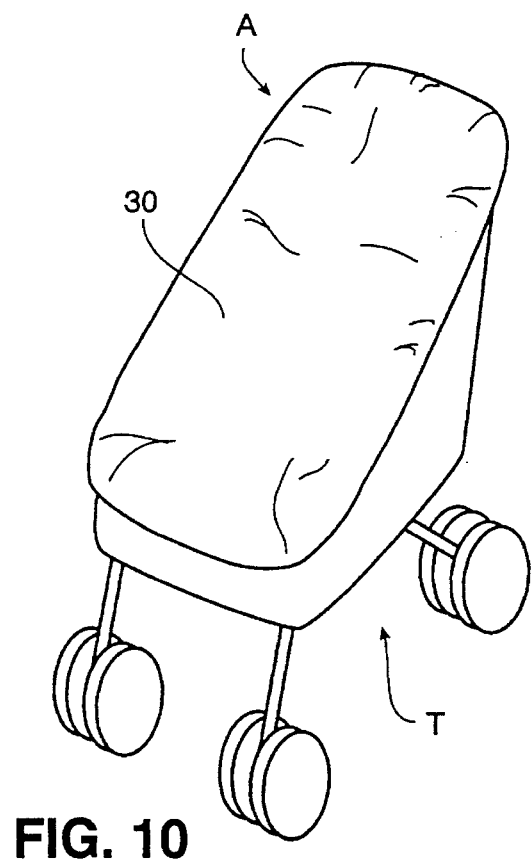

Having thus described the invention, reference will now be made to the accompanying drawings in which:

FIG. 1 is a plan view of a heat protective cover constructed in accordance with and embodying the present invention;

FIG. 2 is a plan view of the heat protective cover, similar to FIG. 1, and showing the formation of a pocket on the rear surface by means of a peripheral elastic band on the cover;

FIG. 3 is a fragmentary vertical sectional view taken along line 3—3 of FIG. 1;

FIG. 4 is a fragmentary vertical sectional view taken along line 4—4 of FIG. 2;

FIG. 5 is a fragmentary rear elevational view showing a rear side of the heat protective cover of the present invention;

FIG. 6 is a fragmentary rear elevational view, similar to FIG. 5, and showing the rear side of an infant retaining device with a portion of the protective cover disposed thereon;

FIG. 7 is a perspective view showing the heat protective cover of the present invention disposed over a portion of a conventional infant car seat;

FIG. 8 is a side elevational view, partially in phantom lines, and showing the heat protective cover disposed fully over the infant car seat of FIG. 7;

FIG. 9 is a perspective view, somewhat similar to FIG. 7, and showing the heat protective cover fully disposed over an infant carrier;

FIG. 10 is a perspective view showing the heat protective cover of the invention disposed over a baby stroller;

FIG. 11 is a perspective view of a slightly modified form of protective cover constructed in accordance with and embodying the present invention; and FIG. 12 is an enlarged fragmentary side elevational view of the embodiment of the protective cover of FIG. 11.

DETAILED DESCRIPTION OF PREFERRED EMBODIMENTS

Referring now in more detail and by reference characters to the drawings which illustrate one of the main embodiments of the present invention, A designates a heat protective cover, often referred to as a "reflective cover" because of its qualities to reduce heat in hot weather conditions and to a lesser degree, cold in cold weather conditions. The protective cover is designed for use with an infant retaining device. One such infant retaining device S is illustrated in FIGS. 7 and 8 in the form of a car seat, although other infant retaining devices are illustrated in FIGS. 9 and 10 of the drawings.

The infant retaining device S includes an outer shell 20 which is preferably formed of a moldable plastic, although the shell itself could be formed of any of a variety of known materials. The shell 20 includes a base wall 22 and a back wall 24 for disposition on a seat of an automotive vehicle, and an upwardly opening infant receiving seat section 26. Furthermore, the shell 20 also includes a pair of arm portions 28, as shown.

The protective cover A of the invention is more fully illustrated in FIGS. 1–5 of the drawings and comprises a sheet 30 having an elastic band 32 secured to the periphery thereof. The edge of the sheet 30 is turned over upon itself on the rear surface thereof in order to form a pocket 34 for including the elastic band 32. The portion of the sheet 30 turned over upon itself to form the pocket 34 is secured thereto by means of lines of stitching 36. Other techniques for securing the elastic band 32 to the sheet 30 however, may be employed in connection with the present invention.

Other tightenable cords may also be used in place of the elastic band, as aforesaid. Thus, for example, a drawstring having two free ends extending out of openings along the periphery of the sheet could be employed. Thus, the user could manually adjust the degree of tightening of the protective cover around the infant retaining device. In this respect, the term "cord" is used in a broad sense to encompass the elastic band or other forms of tightenable cords.

In a preferred embodiment of the invention, the elastic band 32 extends fully around the entire periphery of the sheet 30, which was initially rectangular in shape, but provided with rounded corners. The absence of the elastic band 32 would allow the sheet 30 to assume a fairly rectangular shape, as shown in FIG. 1. However, the elastic band 32 causes the sheet 30 to fold over upon itself on the rear surface 40 thereof, causing the formation of a continuous flap 42 disposed over the rear surface and which thereby forms a continuous pocket 38, as best shown in FIGS. 2, 4 and 5 of the drawings.

The sheet 30 is actually comprised of a pair of plies or layers 44 and 46, as best shown in FIGS. 3 and 4 of the drawings. The layer 44 is a fabric layer and serves as a type of "protection backing." This fabric layer 44 may be formed of any of a number of natural fabrics or synthetic fabrics. In one of the preferred embodiments, the fabric layer 44 comprises a cotton-polyester blend material. However, other fabric layers may be employed. It is important in connection with the present invention that the sheet 30 be fairly soft and pliable so that it can be folded or wadded up into a small compact unit when not in use.

The layer 46 may be only a metalized film, having a highly reflective surface, or otherwise, it may adopt the form of another fabric layer having a metalized film placed thereon. The important aspect of the sheet 46, which is the outermost sheet, is that it must be capable of presenting a highly mirrored surface so as to reflect a substantial portion of solar energy which may be incident thereupon. For this purpose, a silver foil may be employed as the outer surface of the second layer 46. Otherwise, a silver deposition or other highly reflective metal deposition may be made upon the fabric material to present a highly reflective surface.

The fabric used in the production of the protective cover A can also be water repellant, if desired, so as to preclude rain water or other condensation from coming into contact with the infant receiving seat section of the retaining device. Any of a number of conventional water repellant materials may be used on the outer layer for this purpose. Moreover, the fabric of the outer layer may be impregnated with a water resistant composition.

The fabric material forming part of the various layers or other materials used in the protective cover may also be provided with a coating to repel ultraviolet radiation. In this way, the longevity of the heat protective cover can be materially increased.

The removable protective cover A is designed for easy placement on a retaining device. The cover can be readily placed over the shell 20 of the retaining device with one hand, thereby expanding the elastic strap 32 and allowing the cover A to extend over the shell 20. FIGS. 6, 7 and 8 illustrate the use of the protective cover A over a conventional car seat S. In this case, FIG. 7 illustrates the partial placement of the protective cover A partially over the infant receiving seat section of the car seat S. FIG. 8 more fully illustrates the positioning of the protective cover A over the car seat S. It can be seen, by reference to FIGS. 6 and 7, that the protective cover A extends over a back portion of the infant car seat S and around the portion of the bottom base wall of the car seat S. Moreover, it fully encloses the infant receiving seat section 26, in the manner as shown in FIG. 8.

In accordance with the construction as shown in FIGS. 7 and 8, it can be seen that the seat S is entirely protected from exposure to weather related conditions such as solar radiation. Moreover, buckles and like members which are typically formed of metals are also hidden beneath the protective cover A from any form of solar radiation. Therefore, the protective cover A effectively fits over the infant car seat S and precludes excessive heating of the seat from solar radiation.

FIG. 9 illustrates the protective cover A of the present invention disposed over a conventional infant carrier R. Here again, it can be seen that the elastic strap 32 allows a close fitting disposition of the protective cover A on the carrier R. It is not absolutely necessary for the protective cover A to have a snug fitting disposition, that is, it does not have to be form fitting. However, it will not be loose fitting or merely draped over the carrier, which would then allow for buildup of heat underneath the cover FIG. 10 illustrates the protective cover A disposed over a conventional baby stroller T. In this case, the protective cover A fits in a somewhat more taught condition. Here again, the elastic band 32 allows for the heat protective cover A to fit snugly over the entire seat section of the baby stroller T.

FIGS. 11 and 12 illustrate a modified form of heat protective cover B constructed in accordance with and embodying the present invention. In this respect, the heat protective cover B is similar in construction to the heat protective cover A and is used in a substantially similar way, except for the fact that it has additional provisions for adjustability. The heat protective cover B also comprises a sheet 50 similar to the previously described sheet 30. In this case, in order to adjust the overall length of the cover, for example, the cover is folded back upon itself along a somewhat central portion. In this case, the cover is shown with a centrally located fold 52 extending transversely across the cover. Moreover, the cover is provided with a pair of Velcro™ strips 54 and 56, or other type of fiber fastener strips. In this way, when the cover is folded back upon itself to form the fold 52, as shown in FIG. 12, the two Velcro™ strips 54 and 56 are releasably attached to one another.

In accordance with the construction, as shown in FIGS. 11 and 12, it can be seen that the overall length of the sheet can be reduced by creating the interior fold and securing overlapping portions of the sheet. Moreover, it should be understood that the sheet could be provided with a plurality of transversely extending spaced apart Velcro™ strips in order to further adjust the overall length of the sheet. In addition, longitudinally, extending strips could also be used for the same purpose.

In place of the fiber fastener strips, it is also possible to use a zipper, snaps or other forms of releasable attachment means.

The protective cover A of the present invention is also effective in that many of the retaining devices are permanently constructed with plastic or rubber liners or, for that matter, fabric liners. However, many of these liners, in addition to being sensitive to the effects of heat and cold, are also subject to damage from ultra violet radiation. Thus, the heat protective cover A also precludes damaging or fading of these various liners and prolongs the life of the retaining device. In addition, the protective cover may be formed of material so that it is capable of being readily washed.

One of the effective uses of the protective cover of the invention is to actually function as a cover during inclement weather conditions when utilized as a cover for an unoccupied stroller. Further, the fabric may be provided with an insulating liner, as well.

Thus, there has been illustrated and described a unique and novel protective cover for use with infant retaining devices, which is easily positioned, as well as universally adaptable for use with a variety of different and varying sizes, shapes and types of infant retaining devices and which also is effective in conforming to individual seat structures. The present invention thereby fulfills all of the objects and advantages which have been sought. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention.

Having thus described the invention, what I desire to claim and secure by letters patent is:

1. A heat reflective cover for use with an unoccupied infant retaining device having an upwardly opening infant receiving seat section, said heat reflective cover comprising:
    a) a soft and pliable sheet material having a first fabric layer for disposition against the infant receiving seat section of the infant retaining device, said sheet material having a second layer incidental to the first layer and having a highly reflective solar energy reflecting surface to reflect a substantial amount of a heat generating wavelength range contained in solar radiation, said sheet material having a size and shape to fit completely over and effectively form fit to the infant receiving seat section and being soft and pliable so as to extend around a portion of an exterior wall of the infant retaining device, and which cover thereby repels a substantial amount of the solar radiation incident on the seat cover to keep the seat section and the covered portion of the exterior wall of the retaining device relatively cool in hot weather conditions and which is easily positioned on and readily removable from the infant retaining device when an infant is later placed in the infant receiving seat section of the retaining device.

2. The removable heat reflective cover of claim 1 further characterized in that the solar energy reflecting surface is a metalized film surface.

3. The removable heat reflective cover of claim 1 further characterized in that said sheet material is size adjustable by being folded back on itself and secured to itself in the folded back position.

4. The removable heat reflective cover of claim 1 further characterized in that said reflective cover is usable with a number of different types, sizes and shapes of infant retaining devices.

5. The removable heat reflective cover of claim 4 further characterized in that an elastic band extends fully around the entire periphery of the sheet material thereby causing the sheet material to fully engage and extend around a portion of the exterior wall of the infant retaining device.

6. The removable heat reflective cover of claim 4 further characterized in that a tightenable cord extends around a portion of the periphery of the sheet.

7. The removable heat reflective cover of claim 6 further characterized in that a portion of the sheet material is folded upon itself to form a pocket to receive the exterior wall of the infant retaining device along a portion of the periphery of the sheet material.

8. The removable heat reflective cover of claim 6 further characterized in that the tightenable cord is an elastic band.

9. A removable heat reflective cover for use with a plurality of differing sizes and differing types of infant retaining devices and where each retaining device has an exterior wall surrounding an infant receiving seat section therein, said heat reflective cover comprising:
    a) a soft and pliable sheet material having a highly reflective solar energy reflecting surface to reflect a substantial amount of a heat generating wavelength range contained in solar radiation;
    b) said sheet material having a size and shape to fit over and to be used on and effectively form fit to said plurality of differing sizes of infant retaining devices and differing types of infant retaining devices and being soft and pliable to still fully cover the infant receiving seat section of the retaining device and extend about a portion of the exterior wall of the retaining device; and
    c) size adjustable cord means extending around a portion of the peripheral margin of the sheet material enabling the heat reflective cover to be fully disposed over the infant receiving seat section of each infant retaining device with which it is used and to snugly engage the exterior wall of the infant retaining device and which cover thereby repels a substantial amount of the solar radiation incident on the cover to keep the seat section and the covered portion of the exterior wall of the infant retaining device relatively cool in hot weather conditions and which is readily removable from the infant receiving device when the infant is later placed in the infant receiving seat section of the retaining device.

10. The removable heat reflective cover of claim 9 further characterized in that said sheet material comprises a first fabric layer for disposition against the infant receiving seat section of the infant retaining device, and said sheet material comprising a second layer incidental to the first layer and having said highly reflective solar energy reflecting surface.

11. The removable heat reflective cover of claim 9 further characterized in that the size adjustable cord means comprises an elastic band secured to the sheet material.

12. The removable heat reflective cover of claim 11 further characterized in that the elastic band extends fully around the exterior peripheral margin of the sheet material.

13. The removable heat reflective cover of claim 12 further characterized in that a portion of the sheet material is folded upon itself to form a pocket to receive the exterior wall of the infant retaining device along a portion of the periphery of the sheet material.

14. A combination of a removable heat reflective cover used with and being on an infant retaining device having an upwardly opening infant receiving seat section, said combination of said heat reflective cover and said infant retaining device comprising:

a) a retaining device having an exterior wall and an upwardly opening infant receiving seat section for receiving an infant therein;

b) means associated with said retaining device for transporting same with an infant therein; and c) a heat reflective cover removably disposed over and effectively form fitting over a portion of said retaining device and fully over said seat section to reflect solar energy and which is removed when an infant is later placed in the retaining device, said heat reflective cover comprising a soft and pliable sheet material having a first fabric layer for disposition against the seat section of the infant retaining device, said sheet material having a second layer incidental to the first layer and having a highly reflective solar energy reflecting surface to reflect a substantial amount of the heat generating wavelength range contained solar radiation, said sheet material having a size and shape to adaptively fit completely over the infant receiving seat section and extend around a portion of an exterior wall of the infant retaining device and which cover thereby repels a substantial amount of the solar radiation incident on the cover to keep the seat section and the covered portion of the exterior wall of the infant receiving device relatively cool in hot weather conditions and which is readily removable from the infant retaining device when the infant is later placed in the infant receiving seat section of the retaining device.

15. The combination of claim 14 further characterized in that an elastic band extends fully around the entire periphery of the sheet material thereby causing the sheet material to fully engage and extend around a portion of the exterior wall of the infant retaining device.

16. The combination of claim 14 further characterized in that the solar energy reflecting surface is a metalized film surface.

17. The combination of claim 14 further characterized in that an elastic band extends around a portion of the periphery of the sheet material.

18. The combination of claim 17 further characterized in that a portion of the sheet material is folded upon itself to form a pocket to receive the exterior wall of the infant retaining device along a portion of the periphery of the sheet material.

* * * * *